United States Patent [19]

Tangorra

[11] Patent Number: 4,634,396

[45] Date of Patent: Jan. 6, 1987

[54] JOINT FOR THE TRANSMISSION OF MOTION FROM A DRIVING SHAFT TO A DRIVEN SHAFT

[75] Inventor: Giorgio Tangorra, Monza, Italy

[73] Assignee: Industrie Pirelli, S.p.A., Milan, Italy

[21] Appl. No.: 672,949

[22] Filed: Nov. 19, 1984

[30] Foreign Application Priority Data

Nov. 28, 1983 [IT] Italy ............................ 23905 A/83

[51] Int. Cl.$^4$ ............................ F16D 3/52

[52] U.S. Cl. ............................ 464/55; 464/51; 464/87; 464/185

[58] Field of Search ............................ 464/51, 55, 87, 106, 464/147, 160, 185, 904

[56] References Cited

U.S. PATENT DOCUMENTS

| | | | |
|---|---|---|---|
| 322,866 | 7/1885 | Tabor | 464/87 X |
| 1,403,679 | 1/1922 | Forsyth | 464/55 |
| 1,424,051 | 7/1922 | Wayne | 464/55 |
| 1,595,412 | 8/1926 | McCoy et al. | 464/94 |
| 2,566,575 | 9/1951 | Mann | 464/55 |
| 4,300,363 | 11/1981 | Mathues | 464/55 |

FOREIGN PATENT DOCUMENTS

| | | | |
|---|---|---|---|
| 3027060 | 2/1982 | Fed. Rep. of Germany | 464/55 |
| 1426354 | 12/1965 | France . | |
| 2204254 | 5/1974 | France . | |
| 235396 | 6/1925 | United Kingdom | 464/55 |
| 1070524 | 6/1967 | United Kingdom . | |

*Primary Examiner*—Stuart S. Levy
*Assistant Examiner*—Daniel P. Stodola
*Attorney, Agent, or Firm*—Stevens, Davis, Miller & Mosher

[57] ABSTRACT

Elastic joint for the transmission of motion between two shafts, comprising two supports, a driving support and a driven support, associated with the shafts and at least two arms for each support. The joint comprises at least one single element for connecting the two arms, this element being in the form of a closed annular strap of inextensible and flexible material. The strap can be disposed on a plane separating the two supports at a position substantially central to the joint so as to form a polygon whose vertices are the ends of the arms belonging alternatively to the driving support and driven support.

8 Claims, 15 Drawing Figures

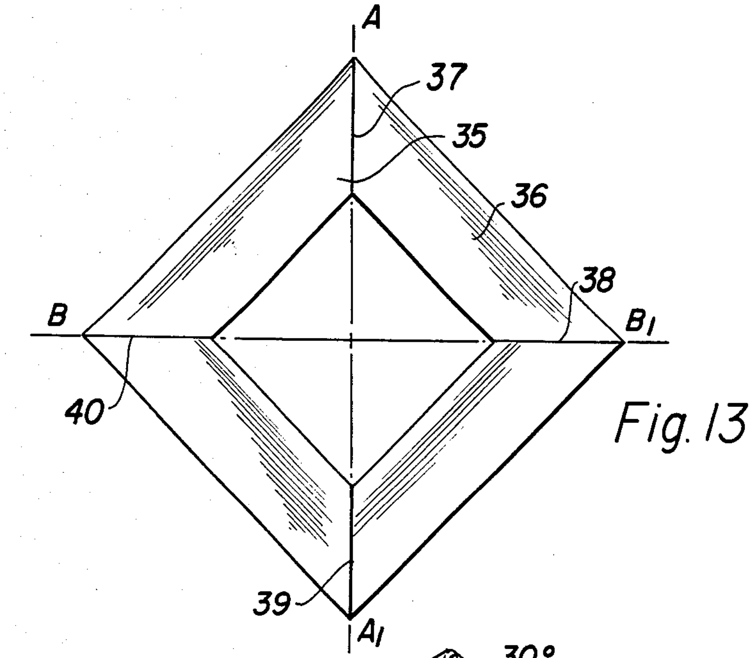
Fig. 13
Fig. 14
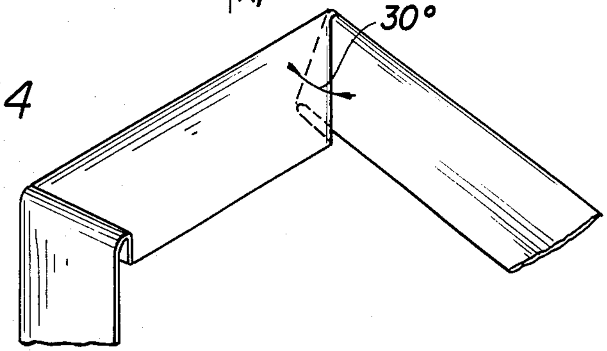
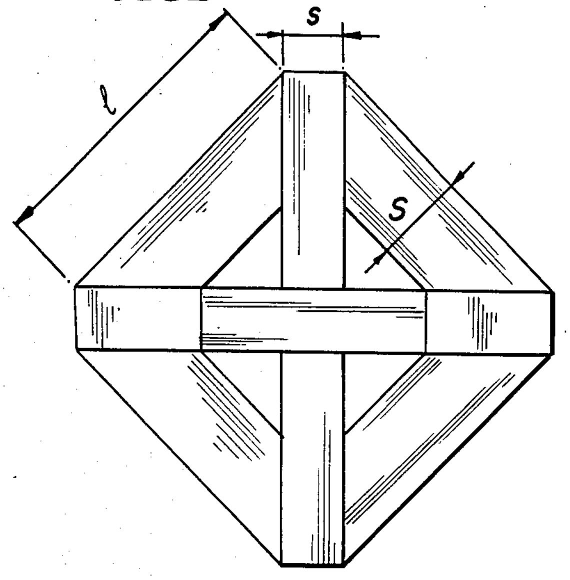
Fig. 15

JOINT FOR THE TRANSMISSION OF MOTION FROM A DRIVING SHAFT TO A DRIVEN SHAFT

DESCRIPTION

The present invention is directed to a joint for the transmission of motion between a driving shaft and a driven shaft and, more precisely and among other things, to a joint of the elastic type.

As known, an elastic joint must do the following tasks:

(a) to allow the connected shafts to undergo relative inclinations;

(b) to permit small relative parallel movements;

(c) to permit a limited variety of relative axial movements;

(d) to permit relative rotations of the two shafts on varying of the transmitted torque, in order to transmit sudden load variations from the driving shaft to the driven shaft in an attenuated manner.

According to one example, an elastic joint can be constituted by a polygonal element formed by rubber blocks, where each polygonal element is provided with bushings at its ends; in this case, the driving shaft and the driven shaft are connected alternatively to the bushings inserted in the rubber polygonal elements.

This type of joint and other like joints based substantially on the use of elastomeric material are adapted, for instance, to realize a power transmission between a driving shaft and a driven shaft graduating the torques and the torque variations from the driving shaft with respect to the driven shaft through a variation of the condition of deformation of the blocks of elastomeric material, such as of rubber.

According to another solution, an elastic joint is constituted mainly by a rubber disc provided with bushings for the passage of the bolts of two spiders connected respectively to the driving shaft and to the driven shaft. Each bushing is connected to each one of the adjacent bushings through a grommet embedded in the disc rubber; preferably, said grommet is folded upon itself so as to take an eight-like shape.

This solution can produce, in some cases, the drawback of an insufficient covering of the grommet with elastomeric material, and further the drawbacks of a complicated and laborious step for assembling the various elements forming the joint. Then, it is to be noted, that the cited solutions can cause high hysteretic losses owing to the presence of the elastomeric material having a considerable thickness, with the consequence of reducing the value of the useful power to be transmitted between driving shaft and driven shaft—especially in the case of marked misalignment between the shafts.

Therefore, the present invention aims at providing a joint for the transmission of motion between a driving shaft and a driven shaft that is adapted to satisfy the requisites of the elastic joints, and at the same time which is constituted by the smallest possible number of useful elements for the transmission of motion between the driving and driven shafts, and which therefore is of easy and rapid assembly so as to be manufactured on an industrial scale at low cost and at high efficiency in the power transmission.

The object of the present invention is a joint for the transmission of motion from a driving shaft rotating around a first axis to a driven shaft rotating around a second axis, said joint comprising two supports, one driving and one driven, associated with said shafts, each support comprising at least two arms, said joint being characterized by comprising at least one single element for the connection between the arms for the transmission of motion between the shafts constituted in the form of a closed annular strap of flexible material and resistant to traction, said strap being arranged on a plane separating the two supports, at a central position with respect to the joint so as to form a polygon whose vertices are the ends of the arms belonging aternatively to the driven and driving supports and whose sides constitute tension rods for the transmission of motion between the driven shaft and the driving shaft, said tension rods being during the operation equal to half of the polygon sides, following alternatively sides under traction and inactive sides and the traction condition exchanging with the inactivity condition on varying the sign of the transmitted torque.

The present invention will be still better understood by the following detailed description made by way of non-limiting example with reference to the figures of the attached sheets of drawing, in which:

FIGS. 9 to 13 show the operations for transforming a strap in the form of a ring into a polygonal system whose sides constitute the tension rods of the joint according to the invention;

FIG. 14 is a partial view of a hexagonal polygonal system of tension rods adapted to constitute the system of tension rods for a joint according to the invention; and FIG. 15 shows the outer development of the polygonal joint to determine the tube adapted for manufacturing a plurality of cylindrical annular straps for various joints according to the invention.

FIGS. 1 to 3 represent a joint 1 for the transmission of motion from a driving shaft rotating around an axis X—X to a driven shaft rotating around an axis Y—Y.

Figure 1:
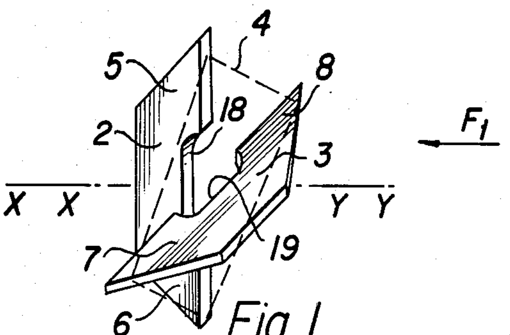
FIG. 1 is a perspective view of the part relating to the supports of a joint according to the present invention in the form of two arms for each support, in which the polygon enveloping the element for the connection between the supports is shown schematically by a broken line.

The joint 1 comprises two supports 2, 3 (in the embodiment of FIG. 1 in a flat shape), a driving support and a driven support, respectively, defined by middle planes being perpendicular to one another and, in one possible embodiment, a single continuous element 4 for the t [redacted]
other [redacted]

Ea [redacted]
steel, [redacted]
to on [redacted]
respe [redacted]

In [redacted]
for t [redacted]
eleme [redacted]
flexib [redacted]
thin s [redacted]
ing e [redacted]
ments [redacted]

Th [redacted]
(FIG [redacted]
Figu [redacted]
ends [redacted]
the a [redacted]
lygon [redacted]
sion [redacted]

Th [redacted]
of te [redacted]
and e [redacted]
possi [redacted]
suppo [redacted]
turin [redacted]
itself [redacted]
tensi [redacted]
the b [redacted]

In [redacted]
coup [redacted]
each [redacted]

In [redacted]
and [redacted]
taine [redacted]
conn [redacted]
the t [redacted]

In [redacted]
shape [redacted]
9 fro [redacted]
the s [redacted]
edge [redacted]
the o [redacted]

Th [redacted]
edge [redacted]
subst [redacted]

Th [redacted]
subst [redacted]
one [redacted]

Th [redacted]
cited [redacted]
end [redacted]
tion [redacted]

In [redacted]
plate [redacted]
supp [redacted]
port [redacted]

Th [redacted]
subs [redacted]
rigid [redacted]
14, 1 [redacted]
by n [redacted]
by t [redacted]
outsi [redacted]
chan [redacted]

As [redacted]
a qu [redacted]
tract [redacted]

the strap is expanded again and the step is repeated, forming two new edges 33 and 34 (FIG. 11) so that the two edges 31 and 32 face each other. In this way, there is obtained in practice a quadrilateral with four equal sides, as shown in the top perspective view of FIG. 11.

Next, the zones adjacent to said edges are prepared for being coupled with the supporting elements. Said transformation is shown in respect of the edge 33 to which the sides 35 and 36 of the annular element converge.

Figure 5:
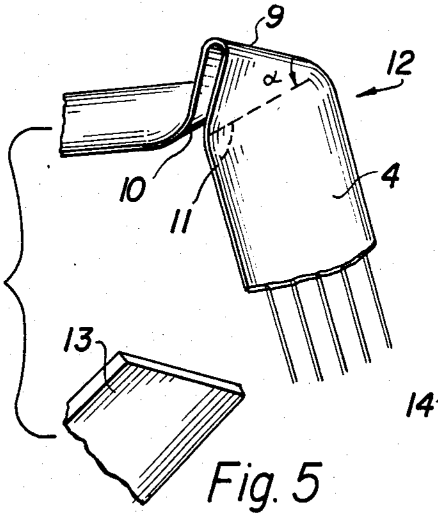
FIG. 5 is a perspective view of the arrangement of the strap represented in FIG. 4 at the ends of the arms of the supports.
Figure 6:
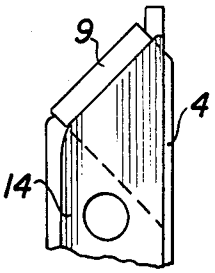
FIG. 6 shows the end of the arms of the supports after the assembling of the annular element of FIG. 4.
Figure 7:
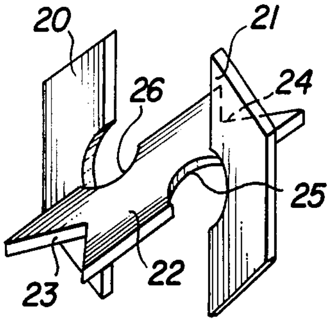
FIG. 7 shows in perspective view the scheme of the supports for an alternative embodiment of the joint with constant angular velocity according to the invention.
Figure 12:
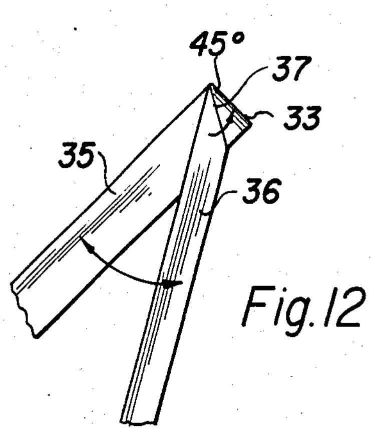
Figure 11:
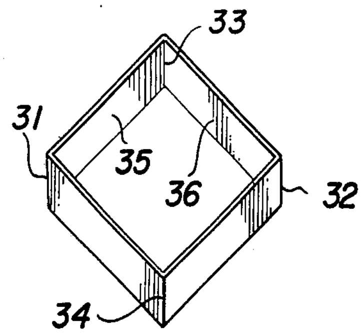

The transformation is carried out with the following steps which, for sake of simplicity, are referred to an angle (FIG. 5) of 45°:

at first, a further edge 37 is formed on two sides of the strap, forming an angle of 45° with the edge 33 (FIG. 11) and forming a right-angled triangle at the end of the annular element;

the step for the formation of further edges 38, 39, 40, inclined at 45° with respect to the edges of FIG. 11 indicated with 32, 34, 31, respectively, is repeated;

at this point, the portions 35 and 36 referred to the edge 33 (FIG. 12) are laid, and likewise the other portions of the annular elements are laid on one and the same plane so as to obtain the four branches for the connection with the arms of the supports, as represented in FIG. 13.

The triangular portions formed at the vertex zone of the quadrilateral of FIG. 13 result in being arranged on perpendicular planes to the plane of the figure, intersecting said plane according to the edges 37, 38, 39 and 40 of FIG. 13.

Figure 9:
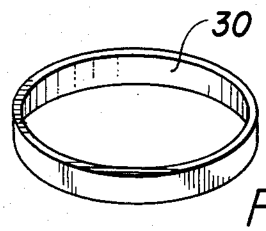
Figure 10:
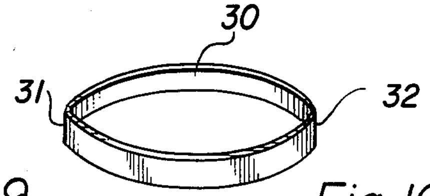

Then, there is obtained the transformation of the cylindrical sleeve of FIG. 9 into a coplanar system of sides of a quadrilateral, as shown in FIG. 13, and thereby forming the continuous element of connection with the arms of the driving and driven supports.

This polygonal system has four triangular zones which, in FIG. 13, are called A, B, $A_1$, $B_1$.

The joint is obtained by fixing the opposite triangular portions A and $A_1$ to a support, for instance for driving support, and the triangular portions B and $B_1$ on the second support, at 90° with respect to the first one.

The portions A and $A_1$ may be above the plane of FIG. 13, and the portions B and $B_1$ below the same plane in order to facilitate the connection to the supports.

Figure 8:
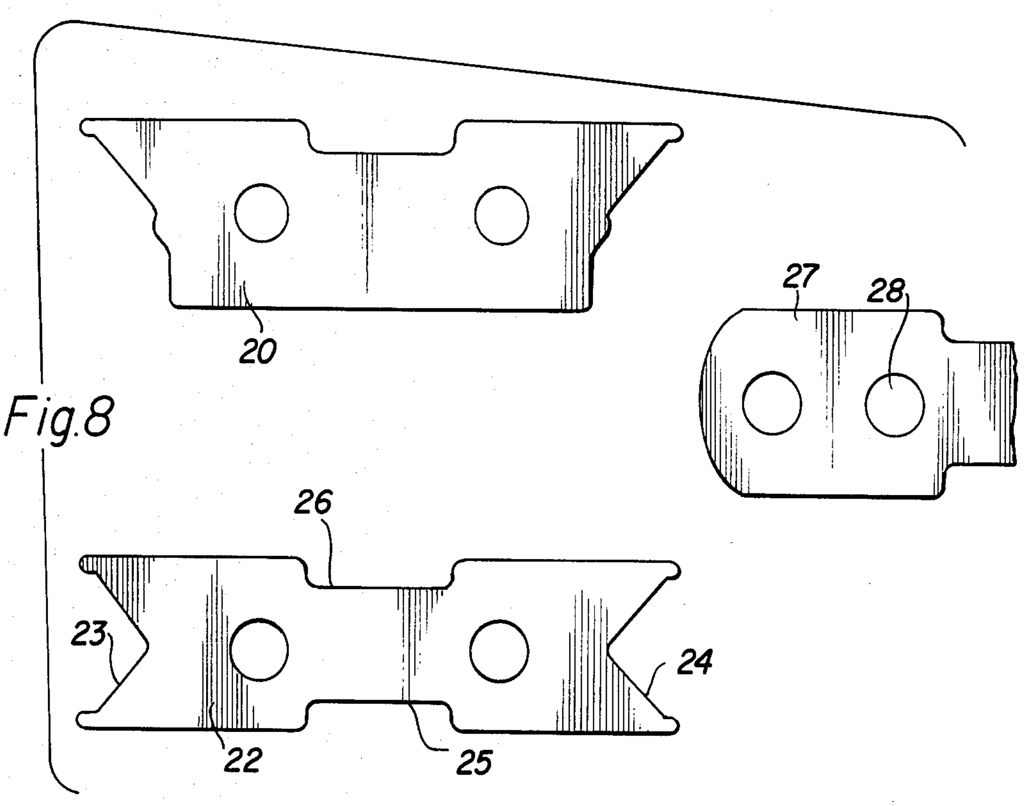
FIG. 8 shows some details of the supports of FIG. 6 according to some embodiments.

The anchoring of the triangular portion to the supporting element may be effected, for instance by forming this latter in three different pieces. For instance, in the case of the joint with constant angular velocity, the central piece is like 22 of FIG. 8, on which the triangular portions of the two annular elements are arranged and the further pieces are constituted by the other two elements, as 27 of FIG. 8, disposed each with respect to the central element.

The three elements 27, 22, 27 are then firmly connected to one another, for instance, by having holes communicating with one another and crossed by clamping bolts.

The invention is not limited to that which has been disclosed up to now, e.g., to the two supports, each provided with two opposite arms connected to each other by a quadrilateral polygonal system. For instance, according to a further embodiment, each support can be provided with three arms situated at 120°, and the system of tension rods is obtained again by starting from a flexible strip resistant to traction in the form of a sleeve and folded so as to obtain a hexagonal polygonal element.

This embodiment is shown schematically in FIG. 14. As there shown, in order to obtain a hexagonal polygonal system the triangular portion for the coupling with the supporting element is characterized by an angle at the vertex of 30°, instead of 45° as in the prveious example of quadrilateral element.

In this case, the six triangular portions are alternatively connected to the driving and driven supports so as to realize a three-arm arrangement at 120° on the driving support, coupled with an analogous three-arm arrangement at 120° on the driven support.

The present invention includes further solutions in which, for instance, one and the same joint comprises more than one strap.

In one embodiment, each of the polygon sides may be formed by a single strap, originally shaped according to an annular configuration and then disposed at the ends with the previously shown foldings. In this embodiment, the joint of FIG. 1 is constituted by four annular straps, instead of only one annular strap.

More generally, in this and in other embodiments, each side of the polygon is formed by a single annular strap.

Also in these embodiments, the furthermost parts of the strap are formed in a triangular shape in order to permit fitting the supports around the chamfer.

Figure 2:
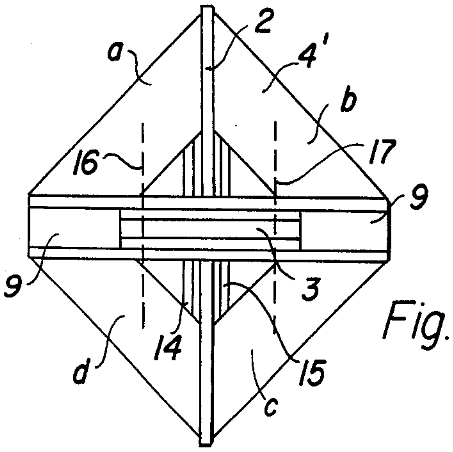
FIG. 2 shows, in a front view according to the arrow $F_1$ of FIG. 1, a complete view of the joint comprising the connecting element in the form of a polygon connecting arms belonging alternatively to the driven and driving supports.
Figure 3:
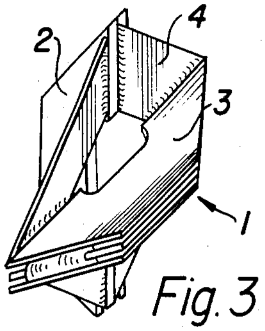
FIG. 3 is a perspective view of the joint.
Figure 4:
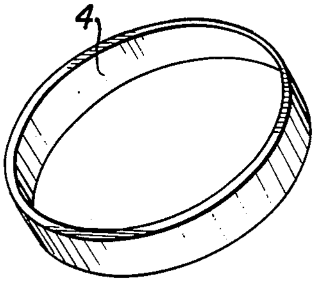
FIG. 4 is a perspective view of a strap, in the manufactured shape as cylindrical ring, adapted for the formation of the polygonal system of the tension rods of FIG. 2.

In fact, as is seen from what has been said above, the essential characteristic of the invention is determined by the presence of at least one strap that, before being mounted on the joint, has a tubular shape and then is connected to the arms of the supports so as to constitute branch connections, with some arms lying on a plane according to a regular polygonal arrangement; for instance, a quadrilateral as in FIG. 1 and 2, said plane coinciding with the ideal plane of separation of the two supports.

In this way of connection between the supports, it is possible to have both relative approaching movements and relative separating movements of said supports, and consequently of the relative shafts, as well as relative inclinations between the axes of the driving and driven shafts. In fact, considering the high flexibility of the strap 4, the branches a, b, c, d (FIG. 2) are connected to the ends of the arms by means of connections assimilable to hinges, with consequent possible rotations of the branches with respect to the supports, as it could happen, for instance, when the support 3 moves near the support 2 or also for instance, when the axis X—X is no longer aligned with the axis Y—Y.

Further, since the strap has per se a certain, even if modest or small extensibility, it is possible to have small relative parallel movements between the shafts and also small relative rotations of one shaft with respect to the other upon variations in the torque to be transmitted so as to absorb elastically the transients of load transmitted by one shaft to the other.

In particular, according to one possible embodiment of the invention, in order to increase the extensibility of the strap one may use reinforcing elements constituted by high twist nylon cords.

Therefore, owing to the cited characteristics, the joint of the invention is an elastic joint.

The joint according to the invention, with respect to the known elastic joints, has the advantage of not undergoing rubber hysteresis losses with consequent heating.

In [redacted]
bear [redacted]
and [redacted]
elem[redacted]
tensi[redacted]
nesse[redacted]
cally[redacted]
Fu[redacted]
prese[redacted]
parts[redacted]
Ac[redacted]
ports[redacted]
mold[redacted]
ble t[redacted]
one [redacted]
ports[redacted]
Al[redacted]
missi[redacted]
taine[redacted]
adap[redacted]
In [redacted]
exam[redacted]
dete[redacted]

whe[redacted]
$l=$[redacted]

$s=$[redacted]

$P=$[redacted]
O[redacted]
shaft[redacted]
been[redacted]
tant [redacted]
geon[redacted]
poly[redacted]
seen [redacted]
strap[redacted]
defin[redacted]
cont[redacted]
penc[redacted]
the p[redacted]
missi[redacted]
Si[redacted]
prod[redacted]
acco[redacted]
reali[redacted]
the t[redacted]
and [redacted]
that [redacted]
widt[redacted]
fied.[redacted]
T[redacted]
has [redacted]
poss[redacted]
man[redacted]
whi[redacted]
elast[redacted]
othe[redacted]
scrib[redacted]
fere[redacted]
orde[redacted]
T[redacted]
one [redacted]
ded [redacted]
T[redacted]
laye[redacted]

annular strap of flexible material and resistant to traction, said strap being disposed substantially within a plane separating the two supports at a central position with respect to the joint so as to form a polygon whose vertices are the ends of the arms belonging alternatively to the driven and driving supports and whose sides constitute the tension rods for the transmission of motion between the driven shaft and the driving shaft, said tension rods during the operation being equal to half of the polygon sides, said strap comprising alternatively a pair of opposite sides under traction and a pair of opposite inactive sides and the traction condition exchanging with the inactivity condition on varying the sign of the transmitted torque, said strap, at each end of the arm to which it is connected, being folded upon itself with superimposition of two sides thereof to form a first edge directed transversely with respect to the width of the strap, said two sides rotating with respect to the superimposition on the arm around a second edge, so as to form a triangle, said second edge forming an angle $\alpha$ of inclination predetermined with respect to the first edge, said two sides projecting from the superimposition to the ends of the arms forming the tension rods lying on a single plane, said two sides superimposed on said arms and forming in the support said first and second edges surrounding a chamfer of corresponding shape and being provided with two rigid elements associated and fixed with blocking means for blocking with respect to said chamfer of the support, said blocking means extending beyond an extent of the annular strip around the chamfer.

2. A joint as in claim 1, characterized in that said annular strap is formed of a sleeve of flexible polymeric material and resistant to traction through two contiguous cuts on planes perpendicular to the axis of the tube.

3. A joint as in claim 1 or 2, characterized in that said annular strap is in the form of rings of elastomeric material embedding reinforcements adapted to withstand the tensile forces in a direction parallel to the edges of the ring.

4. A joint as in claim 1 or 2, characterized in that said annular strap comprises means to absorb elastically variations of torques between the two shafts.

5. A joint as in claim 1, wherein said joint transmits constant angular velocity between the said two driving and driving shafts.

6. A joint as in claim 5, wherein said driving and driven supports comprise end supports whose middle sections are on one and the same first plane, and wherein an intermediate support is disposed between the two end supports lying on a second plane whose middle section is perpendicular to the first plane, said intermediate support forming a rigid element of connection between the two equal joints, each of which comprises a polygonal system of sides lying on said first plane.

7. A joint as in claim 1, characterized in comprising means for avoiding mechanical interferences between the central portions of the two supports in the presence of relative approaching movements between said two shafts.

8. A joint for transmission of motion from a driving shaft rotating around a first axis to a driven shaft rotating around a second axis, said joint comprising a driving support and a driven support associated with said shafts, each support comprising at least two arms, said joint further comprising connection means positioned between said arms for transmission of motion between the shafts constituted in the form of a plurality of individual closed annular straps of flexible material and resistant to traction, said straps being disposed substantially within a plane separating the two supports at a central position with respect to the joint so as to form a polygon whose vertices are the ends of the arms belonging alternatively to the driven and driving supports and whose sides constitute the tension rods for the transmission of motion between the driven shaft and driving shaft, each side of said polygon being formed of a single one of said straps, said tension rods during the operation being equal to half of the polygon sides, said strap comprising alternatively a pair of opposite sides under traction and a pair of opposite inactive sides and the traction condition exchanging with the inactivity condition on varying the sign of the transmitted torque, said strap, at each end of the arm to which it is connected, being folded upon itself with superimposition of two sides thereof to form a first edge directed transversely with respect to the width of the strap, said two sides rotating with respect to the superimposition on the arm around a second edge, so as to form a triangle, said second edge forming an angle $\alpha$ of inclination pre-determined with respect to the first edge, said two sides projecting from the superimposition to the ends of the arms forming the tension rods lying on a single plane, said two sides superimposed on said arms and forming in the support said first and second edges surrounding a chamfer of corresponding shape and being provided with two rigid elements associated and fixed with blocking means for blocking with respect to said chamfer of the support, said blocking means extending beyond an extent of the annular strip around the chamfer.

* * * * *